United States Patent [19]

Funada et al.

[11] 4,416,515

[45] Nov. 22, 1983

[54] OPTICAL FILTER IN FLUORESCENT LIQUID CRYSTAL DISPLAY DEVICES

[75] Inventors: Fumiaki Funada, Yamatokoriyama; Masataka Matsuura, Tenri; Tomio Wada, Nara, all of Japan

[73] Assignee: Sharp Kabushiki Kaisha, Osaka, Japan

[21] Appl. No.: 246,182

[22] Filed: Mar. 23, 1981

Related U.S. Application Data

[63] Continuation of Ser. No. 956,969, Nov. 2, 1978, abandoned.

[30] Foreign Application Priority Data

Nov. 7, 1977 [JP] Japan .................................. 52-133849

[51] Int. Cl.³ .............................................. G02F 1/13
[52] U.S. Cl. ............................. 350/350 F; 350/339 F; 350/349
[58] Field of Search ............... 350/345, 349, 350, 338, 350/350 F, 339 F

[56] References Cited

U.S. PATENT DOCUMENTS

| | | | |
|---|---|---|---|
| 3,844,637 | 10/1974 | Masi ................................. | 350/345 |
| 3,960,753 | 6/1976 | Larrabee ........................... | 350/345 |
| 4,026,637 | 5/1977 | Yamazaki .......................... | 350/338 |
| 4,142,781 | 3/1979 | Baur et al. ......................... | 350/345 |
| 4,176,198 | 12/1979 | Labes ................................ | 350/346 |

*Primary Examiner*—John K. Corbin
*Assistant Examiner*—Paul M. Dzierzynski
*Attorney, Agent, or Firm*—Birch, Stewart, Kolasch and Birch

[57] ABSTRACT

A fluorescent liquid crystal display of the type where light is permeable comprises a fluorescent material contained within a liquid crystal material for providing fluorescence, an exciting source for dispersing exciting radiation to stimulate the fluorescent material, a wavelength band of the fluorescence being apart from that of the exciting radiation to be absorbed by the fluorescent material, and filter means for controlling the propagation of the exciting radiation to enhance display contrast of the fluorescent liquid crystal display.

5 Claims, 5 Drawing Figures

OPTICAL FILTER IN FLUORESCENT LIQUID CRYSTAL DISPLAY DEVICES

This application is a continuation of copending application Ser. No. 956,969, filed on Nov. 2, 1978, now abandoned.

BACKGROUND OF THE INVENTION

The present invention relates to liquid crystal display devices and, more particularly, to optical filters in fluorescent liquid crystal display devices.

R. D. Larrabee has already proposed to add a fluorescent material to a liquid crystal material and to vary fluorescent intensity of the fluorescent material by altering the electric field across the liquid crystal material (RCA Review, Vol 34, P 329, 1973). However, his paper states that he failed to find liquid crystal materials which do not absorb ultraviolet light at room temperature. This appears attributable to the fact that, when causing a fluorescent material in a liquid crystal material to absorb a varying amount of light in accordance with the orientation of the liquid crystal, to vary the flourescence intensity with the light absorption, the exciting light is absorbed by the liquid crystal layer without effectively exciting the flourescent material.

The present inventors have proposed an improved fluorescent liquid crystal display as U.S. patent application Ser. No. 935,246 filed on Aug. 21, 1978 wherein light scattering phenomena takes place in the fluorescent liquid crystal display in response to excitation of an electric field, heat or the like and the flourescence emitted from the fluorescent material is effectively taken out of the flourescent material contained within a liquid crystal display. The corresponding German Patent Application P No. 28 37 257.8 was filed with the German Patent Office on Aug. 25, 1978.

The disclosure of R. D. Larrabee and the U.S. patent application Ser. No. 935,246 are incorporated herein by reference.

It is required in the above-mentioned fluorescent liquid crystal display that display contrast of the liquid crystal display be enhanced for excellent visibility. The present invention can be applied to the fluorescent liquid crystal display of R. D. Larrabee and the U.S. patent application Ser. No. 935,246.

OBJECTS AND SUMMARY OF THE INVENTION

With the foregoing in mind, it is the primary object of the present invention to provide an improved fluorescent liquid crystal display with a higher display contrast.

It is another object of the present invention to provide an improved fluorescent liquid crystal display which includes an optical filter operative to enhance display contrast of the liquid crystal display for excellent visibility.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a fluorescent liquid crystal display comprises a first optical filter disposed at an exciting light side. The first optical filter is featured by having a high transmission in relation to the wavelength of the exciting light where a fluorescent material reveals a high absorption coefficient, and having low transmission in relation to the wavelength of the exciting light where the fluorescent material shows a high fluorescence efficiency.

As to the wavelength of which the exciting light is effectively absorbed by the fluorescent material, the exciting light passes the first optical filter. As to the remaining exciting light where the fluorescence is effectively provided by the fluorescent material, the first optical filter prevents the exciting light from scattering. Therefore, all the exciting light is prevented from scattering out of the display side which is located on an opposite side relative to to the exciting light side, whereby display contrast is enhanced.

In another specific form of the present invention, a second optical filter is formed at the display side to scatter the fluorescence emitted from the fluorescent material and to restrict the propagation of the exciting light having a wavelength which passes through the first optical filter. The second optical filter functions to absorb the exciting light of which the wavelength can not be absorbed by the first optical filter, whereby the display contrast is further enhanced.

BRIEF DESCRIPTION OF THE DRAWINGS

The purpose and function of present invention will become clear from the detailed description given hereinbelow and the accompanying drawings which are given by way of illustration only, and thus are not limitative of the present invention and wherein.

DESCRIPTION OF THE PREFERRED EMBODIMENTS

First of all, a liquid crystal material adapted to the present invention is selected from one of nematic, cholesteric, and smectic mesophases as is well known in itself inasmuch as the liquid crystal material including an organic fluorescent material varies the luminescence efficiency of the organic fluorescent material. The liquid crystal material also contains, individually or in combination, additions for giving a predetermined conductivity, activating agents for controlling pitches of the cholesteric mesophase, or orientation agents for causing the orientation of the liquid crystal material. External stimulation is provided by an electric field, a magnetic field, thermal excitation, mechanical force or the like.

Figure 1:
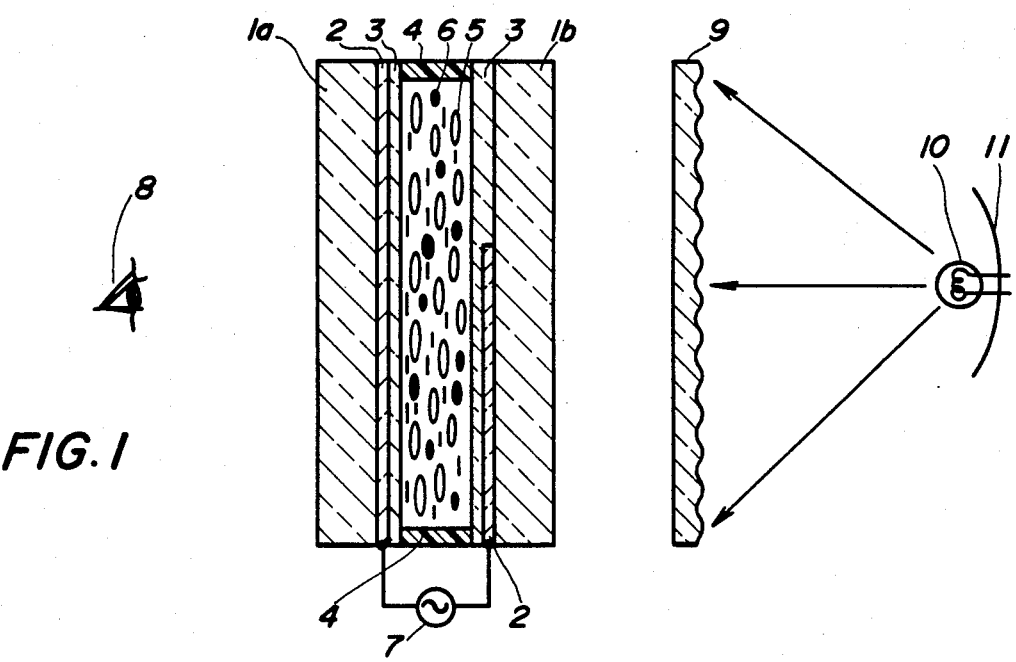
FIG. 1 is a cross-sectional view of a conventional permeable-type fluorescent liquid crystal display.

Referring now to FIG. 1, there is shown a conventional permeable-type fluorescent liquid crystal display wherein there are provided a pair of glass substrates 1a and 1b, transparent electrodes 2 thereon, a liquid crystal molecular orientation layers 3, spacers 4, a liquid crystal material 5, a fluorescent material 6, and a power source 7. The transparent electrodes 2 are desirably patterned to provide visual information. The transparent electrodes 2 made of $In_2O_3$ are formed by evaporation methods or the like. The liquid crystal molecular orientation layers 3 made of $SiO_2$ formed by the evaporation methods or the like are a layer of surfactant of Acid-T which is commercially available from Merk & Co., Inc. The spacers 4 are made of epoxy resin.

The liquid crystal material 5 comprises a liquid crystal mixture of a liquid crystal material No. 605 produced by Hoffmann La Roche, Inc. and 15% by weight of an optically active substance, CB-15 manufactured by BDH Chemicals Ltd. The fluorescent material 6 is Coumarin 7 produced by Eastman Kodak Co.

Among the fluorescent materials, Coumarin 7 and Samaron Brilliant Yellow H6GL are preferable. The fluorescent material 6 is used in an amount of about 0.005 to about 1.0% by weight, preferably 0.01 to 0.5% by weight, of the liquid crystal material 5. The liquid crystal compositions of this invention have the feature of emitting fluorescence at room temperature. The compositions are prepared in the usual manner. The fluorescent material 6 is contained in the composition preferably as dissolved in the liquid cyrstal material 5.

The power source 7 is provided for applying an electric field across the liquid crystal composition for conducting the external stimulation of the composition. A viewer 8 views the fluorescent liquid crystal display from a display side. At an exciting light side opposed to the display side, an excitation lamp 10 is positioned for dispersing exciting light, a concave mirror 11 being positioned behind the lamp. A diffusing plate 9 is provided for introducing the exciting light into the glass substrate 1b, thereby scattering the exciting light in the liquid crystal composition. The exciting light is utilized for stimulation of the fluorescent material 6 to provide the fluorescence.

Phase transition of the liquid crystal composition is carried out by the electric field applied thereto between the colesteric and the nematic mesophases. Focal conic texture of the colesteric mesophase is utilized for providing an active indication using light scattering centers for the fluorescence while hometropic orientation of the nematic mesophase is adopted to perform nonactive indication.

Therefore, it is required that the liquid crystal composition scatter the exciting light for the fluorescent material to produce the fluorescence. Needless to say, the liquid crystal cell comprising the glass substrates 1a and 1b is needed to propagate the exciting light for the fluorescent material and the fluorescence.

In the conventional fluorescent liquid crystal display as shown in FIG. 1, there are problems in that the remaining exciting light scatters out of the display side except for the wavelength of which the exciting light is absorbed by the fluorescent material 6. Therefore, the remaining scattered exciting light cancels the visible fluorescence, whereby display contrast is inevitably reduced.

Figure 3:
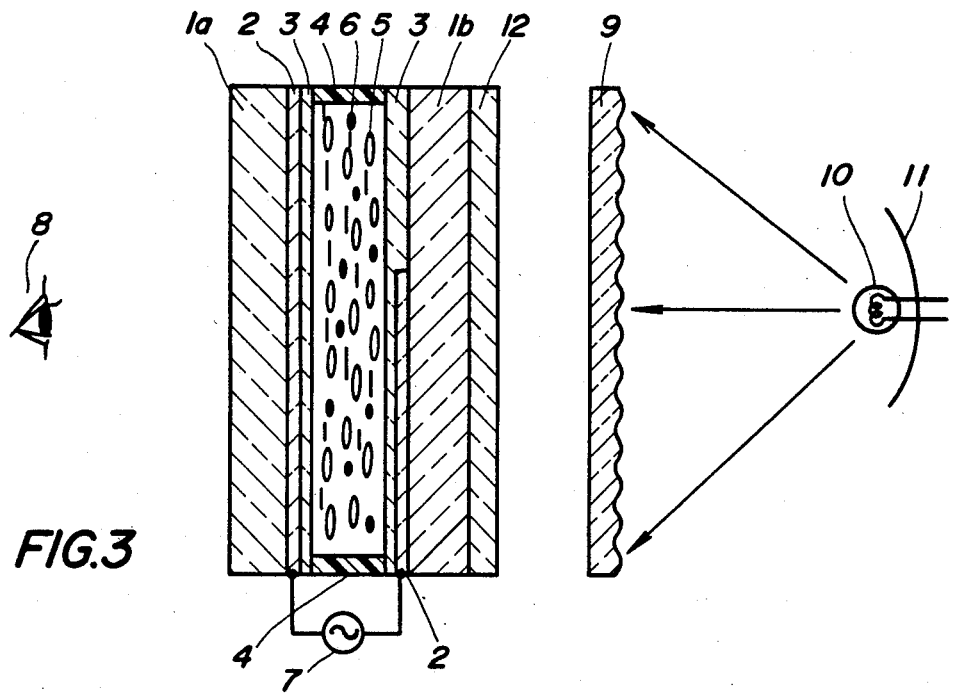
FIGS. 3 and 4 are cross-sectional views of permeable-type fluorescent liquid crystal displays according to the present invention.
Figure 4:
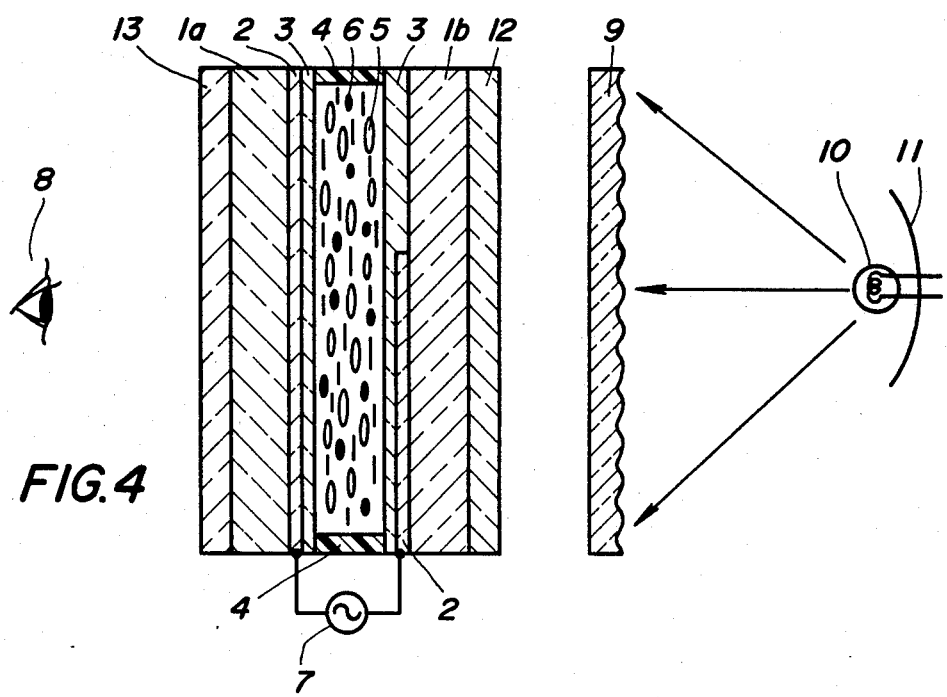

FIGS. 3 and 4 show fluorescent liquid crystal displays of the present invention. Like elements corresponding to those illustrated in FIG. 1 are indicated by like numerals.

With reference to FIG. 3, a first optical filter 12 is further formed between the glass substrate 1b and the diffusing plate 9 in addition to the fluorescent liquid crystal display in FIG. 1. The first optical filter 12 is featured by having a high transmission in relation to the wavelength of the exciting light where the fluorescent material 6 shows a high absorption coefficient, and having a low transmission in relation to the wavelength of the exciting light where the fluorescent material 6 exhibits a large fluorescence efficiency. In connection with the wavelength of which the exciting light is effectively absorbed by the fluorescent material, the exciting light passes the first optical filter. On the other hand, as to the remaining exciting light where the fluorescence is effectively provided by the fluorescent material 6, the first optical filter prevents the exciting light from scattering.

Therefore, the exciting light is prevented from scattering out of the display side to thereby increase display contrast of the fluorescent liquid crystal display. As compared to the conventional fluorescent liquid crystal display shown in FIG. 1, contrast ratio is increased several tens to several hundreds of times and, simultaneously, dichroic indication can be accomplished with accuracy.

Figure 2:
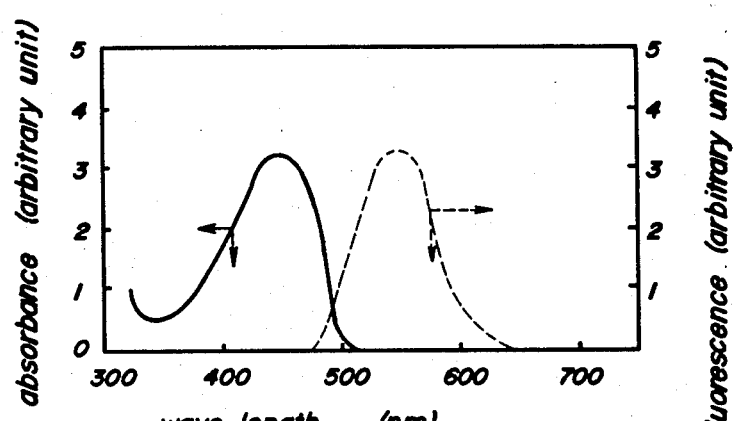
FIG. 2 is a graphical representation of absorbance spectrum (a solid line) and fluorescence efficiency (a dotted line) of Coumarin 7, a fluorescent material adapted to the present invention.
Figure 5:
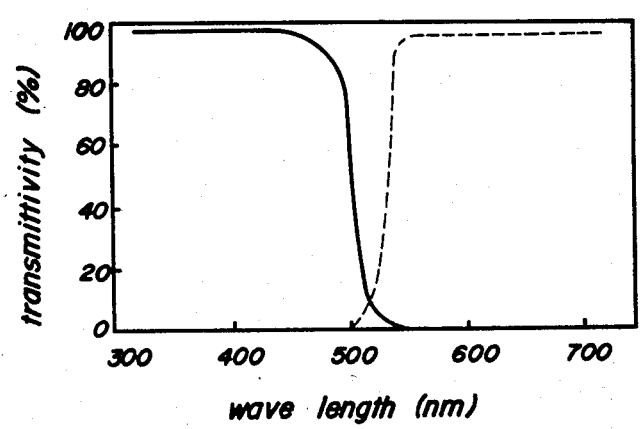
FIG. 5 is a graphical representation of transmittance properties (a solid line) of a first optical filter and that (a dotted line) of a second optical filter adapted to the transient-type fluorescent liquid crystal displays of FIGS. 3 and 4.

FIG. 2 is a graphical representation of absorbance spectrum (a solid line) and fluorescence efficiency (a dotted line) of Coumarin 7 as the fluorescent material 6 adopted to the present invention. Coumarin 7 exhibits the high absorbance at the wavelength between 400 to 500 nm while it shows the high fluorescence efficiency between 500 to 600 nm. The first optical filter 12 is selected to be an optical filter of which the characteristics are the high transmission with respect to the wavelength shorter than about 500 nm and the low transmission in connection with the wavelength longer than the same, as is illustrated by the solid line in FIG. 5 showing the transmittance properties of the first optical filter 12.

With reference to FIG. 4 a second optical filter 13 is further provided, in addition to the first optical filter 12, for absorbing portions of the exciting light at wavelengths which are not absorbed by the first optical filter 12. According to the second optical filter 13, the display contrast is further enhanced. The second optical filter 13 is disposed on the display side adjacent to the glass substrate 1a, in contact with the glass substrate 1a or apart therefrom.

The second optical filter 13 is characterized in that it has a high transmittance in connection with the wavelength of the exciting light wherein fluorescence is effectively generated by the fluorescent material 6, and that it exhibits a low transmittance with respect to the wavelength of which the exciting light passes through the first optical filter 12 and is not absorbed by fluorescent material 6. In other words, the second optical filter 13 exhibits the high transmittance only in relation to the wavelength longer than about 500 nm, as is shown by the dotted line in FIG. 5 representing the transmittance properties of the second optical filter 13.

A significant advantage of the present invention is that it makes it possible to enhance the display contrast by selectively permitting those portions of the exciting light which are absorbed by the fluorescent material 6 and the fluorescence which is emitted from the fluorescent material 6 to pass through the first optical filter 12 and the second optical filter 13, respectively. Further-more, the excitation light to be absorbed by the fluorescent material 6 and the exciting light of the wavelength related to the fluorescence emitted from the fluorescent material 6 are permitted to be absorbed by the second optical filter 13 and the first optical filter 12, respectively. The principles of the present invention depend on the fact that the wavelength band of the exciting light to be absorbed for stimulating purposes is apart from the wavelength band of the resulting fluorescence. More particularly, the wavelength of thus absorbed exciting light is generally shorter than that of the fluorescence.

EXAMPLE

The conventional fluorescent liquid crystal display shown in FIG. 1 is fabricated with the following construction. The glass substrates 1a and 1b are 3.0 mm thick. The transparent electrodes 2 are made of $In_2O_3$ with 500Å thickness. The liquid crystal molecular orientation layers 3 are $SiO_2$ of 1,000Å thickness with a surfactant coating by the afore-mentioned Acid-T. The spacers 4 are made of epoxy resin. The liquid crystal material 5 comprises liquid crystal mixture of a liquid crystal material No. 605 produced by Hoffmann La Roche Inc. and 15% by weight of an optically active substrate, CB-15 manufacture by BDH Chemicals Ltd. Coumarin 7 produced by Eastman Kodak Co. is utilized in an amount of 0.3% by weight.

For the comparison, according to FIG. 3, the first optical filter 12 is provided which is an optical B-440 producted by Hoya Glass Works Ltd. When the exciting light is selected to be 550 nm, the contrast ratio in the fluorescent liquid crystal display in FIG. 3 is about 100 times that of FIG. 1. In FIG. 3, the liquid crystal composition is the nematic mesophase to exhibit a blue color with an applied voltage higher than $2.5 \times 10^4$ V/cm and also the cholesteric mesophase to provide a green color with the applied voltage lower than the same.

While only certain embodiments of the present invention have been described, it will be apparent to those skilled in the art that various changes and modifications may be made therein without departing from the spirit and scope of the invention as claimed.

What is claimed is:

1. A fluorescent liquid crystal display having a display side and a rear side comprising:
   a pair of substrates including a rear substrate and a display side substrate;
   liquid crystal material interposed between said pair of substrates;
   a fluorescent material mixed within said liquid crystal material for producing fluorescence;
   an exciting source at said rear side of said display for emitting exciting radiation to stimulate the fluorescent material to produce said fluorescence;
   a diffusing plate interposed between the exciting source and said rear substrate;
   the wavelength of the fluorescence being different from the wavelength of the exciting radiation, the fluorescent material having a high absorption coefficient with respect to the exciting radiation;
   first filter means between said diffusing plate and said rear substrate for controlling the propagation of the exciting radiation from said rear side to said display, said first filter means permitting the exciting radiation capable of being absorbed by the fluorescent material to pass therethrough and preventing the exciting radiation having a wavelength which is substantially equal to the wavelength of the fluorescence from passing therethrough and preventing said fluorescence from passing therethrough to said rear side of said liquid crystal display; and
   second filter means adjacent said display side substrate for permitting passage of said fluorescence therethrough and for preventing the exciting radiation not absorbed by said fluorescent material from passing therethrough.

2. A fluorescent liquid crystal display according to claim 1, wherein the fluorescent material is Coumarin 7; and
   a boundary wavelength between the wavelength of the fluorescence and the wavelength of the exciting radiation absorbed by the fluorescent material is approximately 500 nm.

3. A fluorescent liquid crystal display in accordance with claim 2, wherein the wavelength of said fluorescence is greater than approximately 500 nm.

4. A fluorescent liquid crystal display in accordance with claim 3, further comprising: power source means for energizing said liquid crystal display means with an applied voltage; said liquid crystal display means exhibiting a blue color when said applied voltage is higher than $2.5 \times 10^4$ v/cm, said liquid crystal display means exhibiting a green color when said applied voltage is lower than $2.5 \times 10^4$ v/cm.

5. A fluorescent liquid crystal display having a display side and a rear side comprising:
   a rear substrate and a display side substrate;
   liquid crystal material interposed between said substrates;
   a fluorescent material mixed within said liquid crystal material for producing fluorescence;
   a source of exciting radiation at said rear side for stimulating said fluorescent material to produce said fluorescence
   the wavelength of said fluorescence being different from the wavelength of the exciting radiation; and
   filter means adjacent said display side substrate for permitting passage of said fluorescence therethrough and for preventing the exciting radiation not absorbed by said fluorescent material from passing therethrough.

* * * * *